United States Patent [19]
Drewery

[11] Patent Number: 6,096,203
[45] Date of Patent: Aug. 1, 2000

[54] WASTEWATER TREATMENT SYSTEM

[75] Inventor: T. Gig Drewery, Kountze, Tex.

[73] Assignee: Aqua Partners Ltd., Lumberton, Tex.

[21] Appl. No.: 09/152,214

[22] Filed: Sep. 11, 1998

[51] Int. Cl.[7] .................................................. C02F 3/20
[52] U.S. Cl. ...................... 210/170; 210/195.4; 210/220; 210/256; 261/122.1
[58] Field of Search ................................. 210/170, 195.3, 210/195.4, 202, 220, 221.2, 256, 197; 261/122.1

[56] References Cited

U.S. PATENT DOCUMENTS

| | | | |
|---|---|---|---|
| 3,883,427 | 5/1975 | Oldham et al. | 210/195.4 |
| 3,956,432 | 5/1976 | Hilling | 261/122.1 |
| 4,021,347 | 5/1977 | Teller et al. | 210/220 |
| 4,192,255 | 3/1980 | Willinger | 261/122.1 |
| 4,650,577 | 3/1987 | Hansel | 210/195.3 |
| 4,983,285 | 1/1991 | Nolen | 210/197 |
| 5,133,906 | 7/1992 | Louis | 261/122.1 |
| 5,221,470 | 6/1993 | McKinney | 210/151 |
| 5,266,239 | 11/1993 | Drewery | 261/64.3 |
| 5,490,935 | 2/1996 | Guy | 210/195.3 |
| 5,785,854 | 7/1998 | McKinney | 210/220 |
| 5,879,550 | 3/1999 | Cox | 210/195.4 |

OTHER PUBLICATIONS

Clearstream Wastewater Systems Brochure, Oct. 1993, pp. 1–4. Hydro–Action, Inc. Brochure, 1994, pp. 1–4.

*Primary Examiner*—Christopher Upton
*Attorney, Agent, or Firm*—Harrison & Egbert

[57] ABSTRACT

A wastewater treatment system having a tank with an inlet and an outlet and an offset access opening residing at a top of the tank, a clarifier compartment positioned within the tank, an aeration compartment formed within the tank around an exterior of the clarifier compartment, and aerators extending into the aeration compartment so as to supply air to the wastewater within the aeration compartment. The access opening is formed between a center of the top and an outer wall of the tank. Each of the aerators includes an air inlet, a conduit connected to the air inlet, a diffuser assembly connected to an end of the conduit opposite the air inlet and an anchor connected to the diffuser assembly opposite the conduit so as to maintain the diffuser in a fixed position within the aeration compartment. The diffuser assembly has a plurality of diffusers formed thereon.

21 Claims, 5 Drawing Sheets

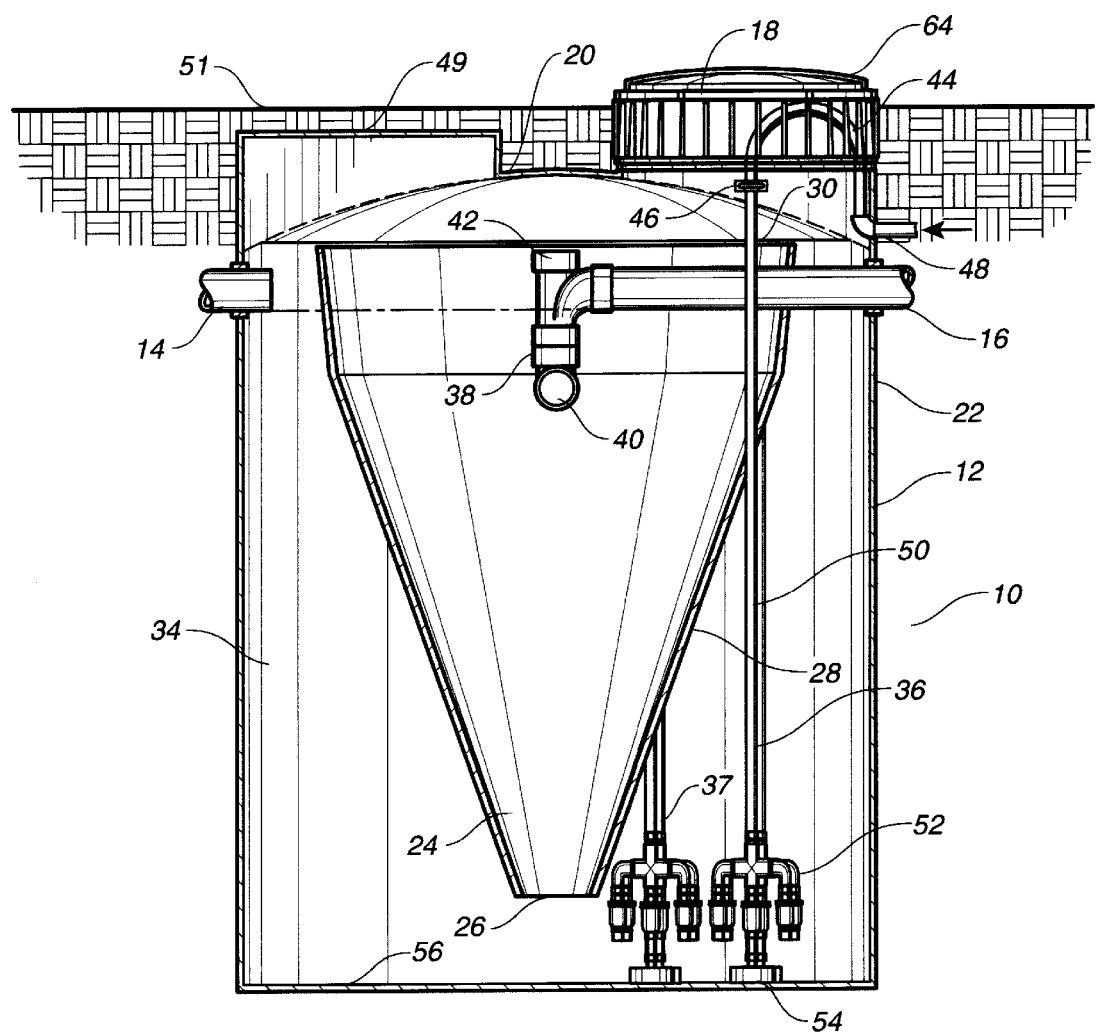
FIG. 1
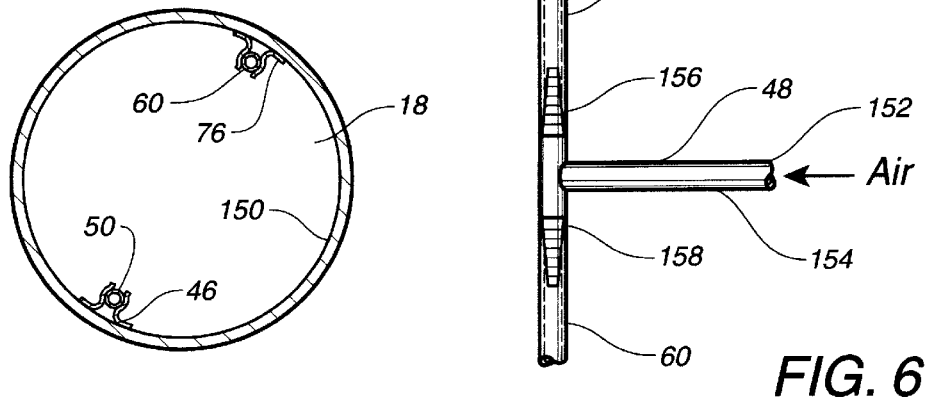
FIG. 5
FIG. 6

WASTEWATER TREATMENT SYSTEM

TECHNICAL FIELD

The present invention relates to extended aeration wastewater treatment systems. More particularly, the present invention relates to the construction of a tank used for such wastewater treatment systems. Furthermore, the present invention relates to aeration systems as used within such wastewater treatment systems.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a downsized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Action, Inc. of P.O. Box 12583, Beaumont, Tex. The system is known as the HYDRO-ACTION™ system. It is a self-contained automatic system. The HYDRO-ACTION™ system incorporates two separate compartments, each performing a specific function in the digestion process. First, raw waste water enters the aeration compartment and is mixed with activated sludge and aerated. An airpump injects large quantities of air into this compartment by means of porous ceramic diffusers located above the bottom perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

This HYDRO-ACTION™ system allows homes to be built on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

The aforedescribed HYDRO-ACTION™ system has been proven to be extremely successful in the treatment of waste. This HYDRO-ACTION™ system is the subject of U.S. Pat. No. 5,266,239, issued on Nov. 30, 1993 and entitled "Diffuser Assembly for an Aeration System of a Wastewater Treatment Plant".

Although the HYDRO-ACTION™ system has been extremely successful in actual use, there are several improvements which were desired in such a system. First, it was important to improve the accessibility to the aerators within the aeration compartment. In this system, it was necessary to remove the access cover and to reach through openings in the clarifier compartment so as to manipulate and pull the aerator assemblies through the access opening. Since the access opening provided a direct view only to the interior of the clarifier compartment, it was often quite difficult to obtain samples of wastewater within the aeration compartment. Such sampling could only occur after a rather difficult manipulation of instruments threaded through the various components of the system. As such, a need developed so as to allow the aeration conduits and diffusers to be more easily accessible from the top of the buried tank.

Under certain circumstances, it would be necessary to bury the HYDRO-ACTION™ system to such a depth that access to the components on the interior of the tank through the access opening was virtually impossible. When the tank would be buried a sufficient depth, it was necessary to attach a series of riser sections in stacked relationship upon the access opening. When a sufficient number of risers were stacked on the access opening, entry into the interior of the tank became even more difficult. Under such circumstances, it was often difficult or impossible to actually install the tank beyond certain depths. Furthermore, in the HYDRO-ACTION™ system, when a diffuser assembly became clogged or inoperable, it was necessary to remove the entire aerator assembly so as to properly replace the diffuser. As a result, a need developed so as to allow the system to continue to operate properly even though a single diffuser became clogged or otherwise inoperative.

In the past, various patents have issued relating to such extended aeration wastewater treatment systems. In each of these prior patents, the access opening is located centrally of the top of the tank. The aerator assemblies are arranged peripherally around the clarifier compartment. Each of the conduits extending to the diffusers was fixedly mounted on the interior of each of the tanks. For example, U.S. Pat. No. 4,650,577, issued on Mar. 17, 1987 to B. L. Hansel, describes an apparatus for treating and purifying wastewater. This system includes a vertical tank for receiving wastewater and discharging treated water. A vertical inverted frustoconical clarifying structure is located within the tank and connected to the tank. This clarifier has side walls which diverge from a bottom opening to a larger top opening. A series of air injecting pipes are connected to the tank and located inside the tank for injecting air into the lower portion of the tank to aerate the wastewater in the tank. The aeration pipes are arranged to extend vertically around the exterior of the clarifier compartment. An access opening is provided in the center of the top of the tank so as to allow access to the interior of the tank. Access to the aeration assemblies is extremely difficult through such an access opening. Furthermore, this access opening is located in a position such that sampling of the wastewater in the aeration compartment is difficult or impossible.

U.S. Pat. No. 4,983,285, issued on Jan. 8, 1991, to H. E. Nolen teaches a wastewater treatment plant having an inverted frustoconical-shaped clarifier concentrically suspended within an outer tank. The aeration piping is force fitted into U-shaped slots formed in the support grid for the clarifier. An access opening is provided centrally on the top of the tank. Once again, access to the aeration assemblies becomes very difficult through such a small centrally-located access opening.

U.S. Pat. No. 5,221,470, issued on Jun. 22, 1993 to J. L. McKinney, teaches a wastewater treatment plant that uses aerobic bacteria to digest solid particles in the wastewater. The tank has an inverted frustoconical-shaped clarifier compartment located within the tank. The area between the exterior of the clarifier compartment and the inner surface of the tank wall serves as the aeration chamber. Access to the aerator assemblies is accomplished by fitting a flexible tube through a section of rigid conduit. A diffuser is attached to the end of the flexible tube. A central access opening is provided on the top of the tank. This access opening is positioned directly above the clarifier compartment. This makes the sampling of wastewater in the aeration tank difficult or impossible. Furthermore, the complicated arrangement of rigid conduits and flexible piping makes removal of the diffuser assembly and the associated aerator assembly very difficult. A great deal of manipulation is required so as to remove such diffusers for repair or replacement.

It is an object of the present invention to provide a wastewater treatment system which allows for easy access to the aerator assemblies.

It is another object of the present invention to provide a wastewater treatment system which allows the tank to be installed deeply into the earth while maintaining access to the aerator assembly.

It is another object of the present invention to provide a wastewater treatment system which allows access to the interior of the clarifier compartment and the interior of the aeration chamber so as to facilitate sampling of liquids in such compartments.

It is a further object of the present invention to provide a wastewater treatment system which utilizes a minimal number of aerator assemblies.

It is still a further object of the present invention to provide a wastewater treatment system which reduces the requirements for the replacement of diffusers.

It is still a further object of the present invention to provide a wastewater treatment system which optimizes mixing within the aeration chamber.

These and other objects and advantages of the present invention will become apparent from a reading of the attached specification and appended claims.

SUMMARY OF THE INVENTION

The present invention is a wastewater treatment system that comprises a tank having an inlet and an outlet and an access opening residing at a top of the tank in an area between a center of the top of the tank and an outer wall of the tank, a clarifier compartment positioned within the tank and having an upper edge spaced away from an inner wall of the tank, an aeration compartment formed in the tank around an exterior of the clarifier compartment, and an aerator extending into the aeration compartment so as to supply air to wastewater within the aeration compartment. The upper edge of the clarifier compartment is positioned directly below the access opening. The outlet communicates with an interior of the clarifier compartment. The inlet communicates with the aeration compartment.

In the present invention, the aerator is positioned in the aeration compartment directly below the access opening. The aeration compartment has a portion formed between the upper edge of the clarifier compartment and the inner wall of the tank. The access opening extends over this portion.

In the present invention, the aerator includes an air inlet, a conduit connected to the air inlet, and a diffuser assembly connected to an end of the conduit opposite the air inlet. The conduit has a portion positioned directly below and adjacent to the access opening. The tank has clip member affixed thereto adjacent to the access opening. This portion of the conduit is removably received by the clip member. The conduit can be entirely flexible, a flexible portion with a rigid portion, or entirely rigid.

In the present invention, the diffuser assembly includes a diffuser connected to the conduit so as to emit air bubbles into the aeration compartment, and an anchor member connected to the diffuser opposite the conduit. The anchor has a weight such that the diffuser will fixedly reside within the aeration compartment. In the present invention, another conduit is connected to the air inlet. Another diffuser assembly is connected to this other conduit opposite the air inlet. The diffuser is positioned directly below the access opening.

In the preferred embodiment of the present invention, the access opening has an edge aligned with a wall of the tank. This access opening has a diameter less than a radius of the top of the tank. A plurality of risers can be affixed in stacked relation to the access opening. Each of the risers has an interior which opens to the access opening. This plurality of risers extends a desired distance above the top of the tank.

The present invention employs a special aerator assembly for the wastewater treatment system. This aerator assembly includes a plurality of diffusers that are connected to the flexible conduit at the end opposite the air inlet. The anchor member is affixed to the plurality of diffusers opposite the flexible conduit. The anchor member has a density such that it will reside, when released, upon the bottom of the tank. The plurality of diffusers includes a connector member connected with the flexible conduit, a first rigid conduit extending from the connector member, a first diffuser affixed to the first rigid conduit, a second rigid conduit extending from the connector member, and a second diffuser affixed to the second rigid conduit. The first rigid conduit and the second rigid conduit reside in generally parallel relationship. The first diffuser is removably affixed to the first rigid conduit. The second diffuser is removably affixed to the second rigid conduit. In the preferred embodiment of the present invention, a third rigid conduit extends from the connector member. A third diffuser is removably connected to this third rigid conduit. The third rigid conduit is in generally parallel relationship to the first and second rigid conduits.

The present invention utilizes a plurality of aerator assemblies extending into the aeration compartment. This plurality of aerator assemblies is positioned in the tank within a section formed by an angle of more than 36 degrees and less than 72 degrees from the central axis of the clarifier compartment. In the preferred embodiment of the present invention, the plurality of aerator assemblies includes two and only two aerator assemblies.

BRIEF DESCRIPTION OF THE DRAWINGS

FIG. 1 is a cross-sectional side view showing the wastewater treatment system of the present invention.

FIG. 5 is a detailed view, in cross section, showing the attachment of the flexible conduit to the clip members.

FIG. 6 is a detailed transparent view showing the air inlet of the present invention.

DETAILED DESCRIPTION OF THE PRESENT INVENTION

Figure 2:
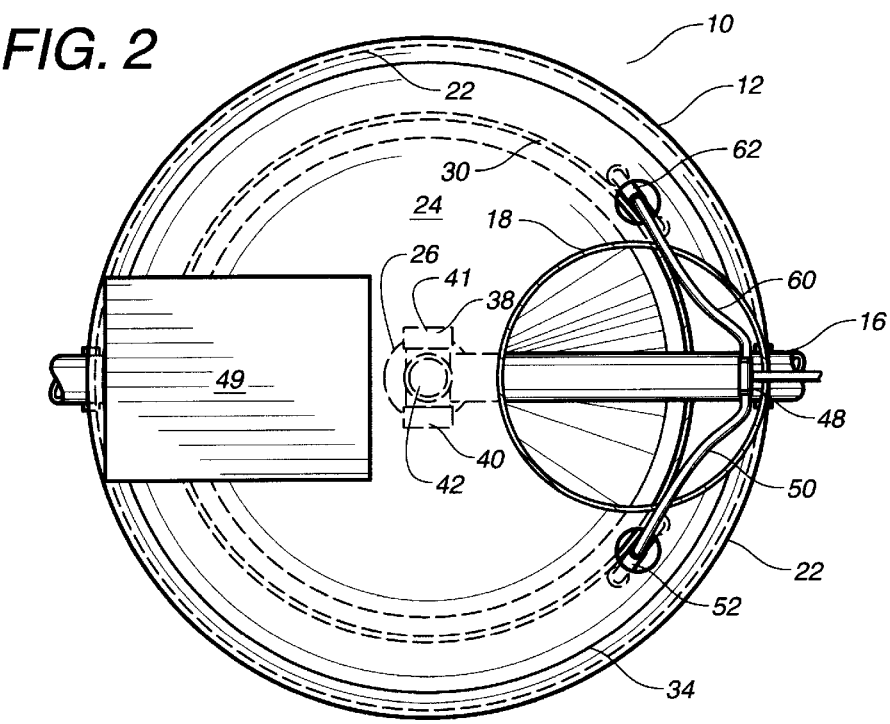
FIG. 2 is a cross-sectional plan view showing the wastewater treatment system of the present invention.

Referring to FIG. 1, there is shown at 10 the wastewater treatment system in accordance with the preferred embodiment of the present invention. The wastewater treatment system 10 includes a tank 12 having an inlet 14 and an outlet 16. The tank has an offset access opening 18 residing at a top 20 of the tank 12. As can be seen in FIG. 1, the access opening 18 is formed between a center of the top 20 and an outer wall 22 of the tank 12. A clarifier compartment 24 is positioned within the tank 12. The clarifier compartment 24 is of an inverted frustoconical configuration having an opening 26 at the bottom of the clarifier 24 and walls 28 which diverge from the opening 26. The clarifier 24 has an upper edge 30 which is spaced away from the inner wall 32 of the tank 12. The upper edge 30 is positioned directly below the access opening 18. The outlet 16 communicates with the interior of the clarifier compartment 24. An aeration compartment 34 is formed in the tank around the exterior 28 of the clarifier compartment 24. The inlet 14 communicates with the aeration compartment 34. An aerator assembly 36 extends into the aeration compartment 34 so as to supply air to the wastewater within the aeration compartment 34.

As can be seen in FIG. 1, the tank 12 is of a generally cylindrical configuration. Unlike the tank configurations of the prior art, the tank 12 includes an offset access opening 18. The access opening 18 has a diameter which is less than a radius of the top 20 of the tank 12. The access opening 18 is configured so as to have an edge generally aligned with the side 22 of the tank 12. The opposite side of the access opening 18 is positioned inwardly of the center of the top 20 of the tank 12.

The inlet 14 is a tube that extends through the wall of the tank 12 so as to communicate with the interior of the aeration compartment 34. The outlet 16 is a tubular member which extends into the interior of the aeration compartment 24. The outlet 16 has a T-shaped end piece 38 with an opening 40 on one end of the T-shaped end piece 38. Another opening, such as 40, is formed on the opposite side of the T-shaped end piece 38. An upper gas outlet opening 42 is formed on the end piece 38 so as to allow any gases within the clarifier compartment 24 to escape therefrom. The treated effluent will pass outwardly from the clarifier compartment 24 through the outlet 16.

Importantly, as can be seen in FIG. 1, the aerator assembly 36 is positioned in the aeration compartment 34 generally in the area below the access opening 18. The aeration assembly 36 has a portion 44 which is formed between the upper edge 30 of the clarifier 24 and the inner wall 32 of the tank 12. The access opening 18 extends over the portion 44. A clip 46 is provided so as to secure the portion 44 in its desired position adjacent to the access opening 18. In the preferred embodiment of the present invention, there is another aerator assembly 37 in spaced relationship on the same side of the clarifier 24. The aerator assembly 37 is offset a suitable distance from aerator assembly 36 a suitable distance so as to maintain separate air flow paths within the liquid in the tank 12. Specifically, both of the aerator assemblies should be positioned within a 36° to 72° of each other.

The aerator assembly 36 includes an air inlet 48, a conduit 50 and a diffuser assembly 52. The conduit 50 is connected to the air inlet 48. The diffuser assembly 52 is connected to an end of the conduit 50 opposite the air inlet 48. The portion 44 of the conduit 50 is positioned directly below and adjacent to the access opening 18 directly above the diffuser assembly 52. The clip member 46 is affixed adjacent to the access opening 18. The portion 44 of the conduit 50 is removably received by the clip member 46, as will be described hereinafter.

The conduit 50 can be flexible entirely along its length, partially flexible and partially rigid, or entirely rigid along its length. The conduit 50 is preferably flexible along its length. The flexibility facilitates the ability to pull the diffuser assembly upwardly and outwardly through access opening 18. The flexible conduit does not have to have a precisely measured length. It is certainly easier to transport, store and replace a flexible conduit. If the conduit 50 is partially flexible and partially rigid, the rigid portion should extend, preferably, from the diffuser assembly 52 up to an area just below clip member 46. A suitable fastener would be used to join the flexible portion to the rigid portion. This type of arrangement of the conduit 50 would not require precise measurements, but would create more difficulty with respect to the retrieval of the diffuser assembly 52. The flexible portion would have to be disconnected from the rigid portion prior to the removal of the diffuser assembly 52 from the tank 12. An entirely rigid conduit 50 would require precise sizing to the depth of the tank and to the connection to the air inlet 48. The entirely rigid conduit 50 would have to be disconnected from the air inlet 48 in order to remove the diffuser assembly 52 from the tank.

The diffuser assembly 52 is connected to the conduit 50 so as to emit air bubbles into the aeration compartment 34. An anchor member 54 is connected to the diffuser 52 opposite the conduit 50. The anchor 54 should have a suitable weight so as to rest freely against the bottom 56 of tank 12. Generally, the anchor member 54 should have a density greater than water so that the conduit 50, the diffuser assembly 52 and the anchor 54 will drop through the wastewater so that the diffuser assembly 52 can reside in a fixed position a desired distance from the bottom 56. The diffuser assembly 52 has a specialized configuration in the present invention which will be described in greater detail herein in association with FIGS. 7 and 8.

Figure 9:
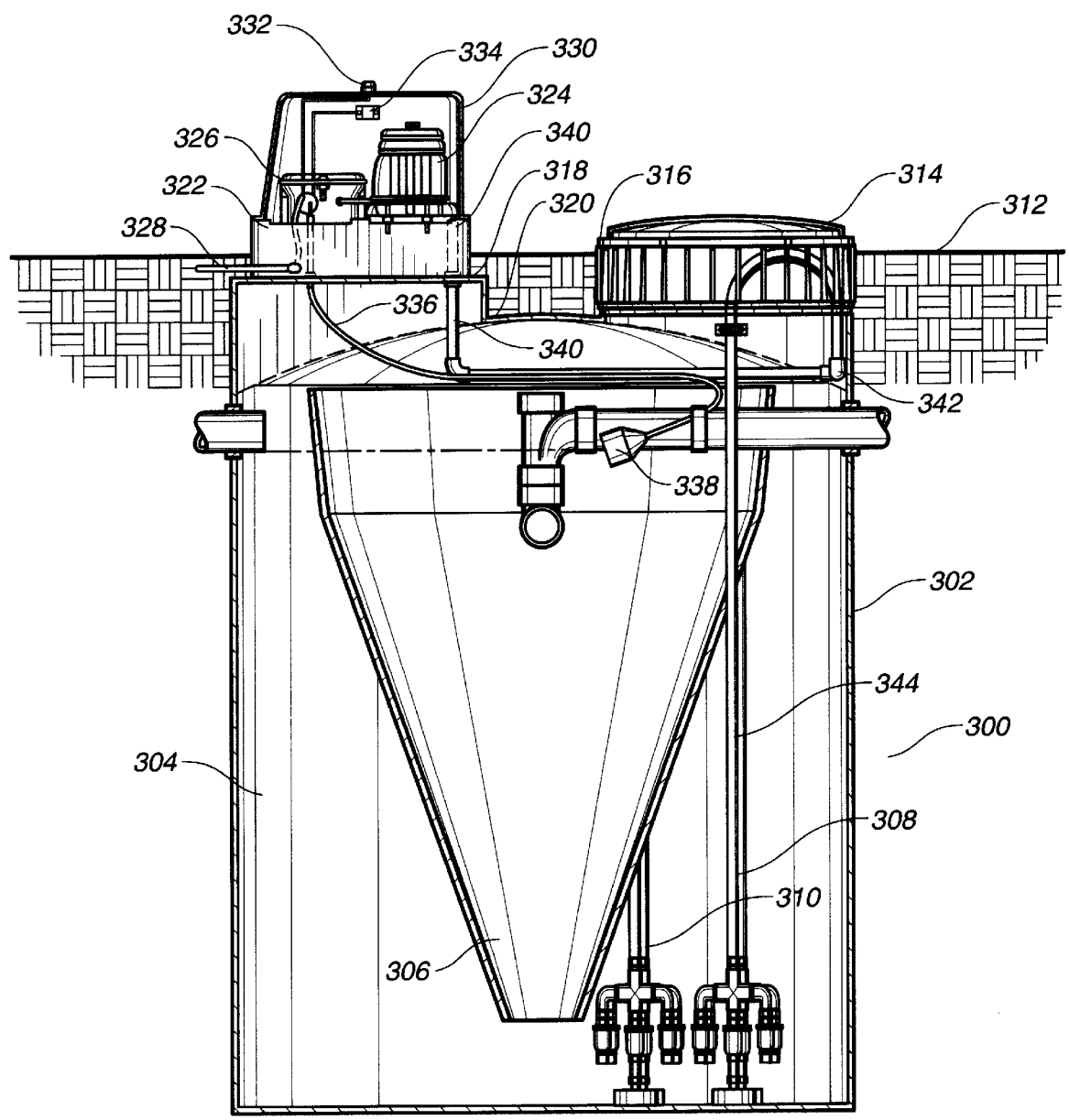
FIG. 9 is a cross-sectional side view of an alternative embodiment of the present invention.

As can be seen in FIG. 1, the access opening 18 is formed along the top 20 of tank 12. In the present invention, it should be noted that there is a platform section 49 formed on the top 20. The platform section 49 is shown as formed on an opposite side of the top 20 from the access opening 18. The platform 49 is in a suitable condition for allowing the placement of a control panel and a pump therein. The platform 49 can be adapted so as to allow suitable conduits, air lines, and electrical connections to be placed into the interior of the tank 12. A description and illustration of the use of the pump and control panel as placed upon the platform 49 is shown in FIG. 9. In FIG. 1, the platform 49 is shown in its configuration in which no pump or control panel is placed upon the platform 49. Under such circumstances, the platform 49 can be buried below the level of the earth 51. The only item which extends outwardly of the earth 51 will be the access opening 18.

In FIG. 2, it can be seen that the tank 12 of the wastewater treatment system 10 has a generally cylindrical configuration. The inlet 14 resides on one side of the tank 12. The outlet 16 extends outwardly from the opposite side of the tank 12. As can be seen in FIG. 2, the outlet 16 extends into the interior of the clarifier compartment 24 and has a T-shaped end piece 38 within the clarifier compartment 24. An opening 40 is formed on one end of the T-shaped end piece 38. Another opening 41 is formed on the opposite end of the T-shaped end piece 38. A top opening 42 is formed on another end of the T-shaped end piece 38. The outlet openings 40 and 41 are located generally centrally in the clarifier compartment 24 above the bottom opening 26.

As can be seen in FIG. 2, the access opening 18 is offset from the center of the tank 12 so as to have an edge which is generally aligned with the wall 22 of the tank 12. As can be seen, the air inlet 48 is a T-shaped fitting which has one end connected to conduit 50. Another conduit 60 is connected to an opposite end of the T-shaped fitting of the air inlet 48. Diffuser assembly 52 is shown as attached to the conduit 50. Another diffuser assembly 62 is shown as connected to the end of the conduit 60.

As can be seen in FIG. 2, each of the diffusers 52 and 62 is located within a pie slice of 36° to 72° as taken across the area of the tank 12. Within the concept of the present invention, this arrangement of the diffusers 52 and 62 enhances the ability to treat the wastewater on the interior of tank 12. This positioning of the diffusers 52 and 62 will serve to maintain separate flow paths of air bubbles. Air bubbles are emitted by the diffusers 52 and 62 and will immediately travel upwardly to the surface of the effluent within the aeration compartment 34 of tank 12. Since the diffusers 52 and 62 are separated by at least 36°, the air bubbles will not commingle when they travel toward the surface of the effluent. Experiments have shown that upon reaching the surface of the effluent within the aeration compartment 34, this arrangement of diffusers 52 and 62 will create a vortex therebetween. This vortex is an extra turbulent zone where air is mixed with the effluent in the aeration compartment 34. This vortex effect serves to draw the air bubbles back downwardly into the tank. As a result, the diffusers 52 and 62 generate fine air bubbles and also keep them in solution longer than systems in which the diffusers 52 and 62 are placed closer together or in systems in which the diffusers 52 and 62 are placed greater than 72° apart. Experimentation has shown that 72° is the maximum distance that the diffusers 52 and 62 should be apart while still creating a proper vortexing effect.

In the present invention, it can be seen that the diffuser assemblies 52 and 62, along with their associated conduits 50 and 60, are located adjacent the area of the access opening 18. The portion 44 is affixed adjacent to the access opening 18. As a result, in order to remove the diffuser assemblies 52 and 62, it is only necessary to open the cover 64 of the access opening 18. When the cover 64 is removed, the portion 44 of the conduit 50 can be easily grabbed. A pulling force will cause the anchor 54, and its associated diffuser assembly 52, to lift from the bottom 56 of tank 12. As such, the diffuser assembly 52 can be easily pulled to the surface. Unlike the prior art, the offset relationship of the access opening 18 allows for easy serviceability of the aerator assembly 36 of the present invention. Since both of the diffuser assemblies 52 and 62 are located adjacent to and below the access opening 18, they can be easily lifted to the surface without any need to "thread" such assemblies through openings in the clarifier or through rigid conduits attached to the walls of the tank. This easy serviceability means that the diffuser assemblies 52 and 62 can be easily replaced, repaired, or otherwise modified without the need to reach deeply into the interior of the tank 12.

A further advantage of this offset relationship of the access opening 18 is that a sampling of the wastewater in the aeration compartment 34 or from the clarifier 24 can be easily carried out. As can be seen in FIG. 2, the access opening 18 is located directly above the space between the edge 30 of the clarifier 24 and the inner wall 22 of the tank 12. As a result, a sampling instrument can be easily lowered into the wastewater within the aeration compartment 34 or into the clarified effluent in the clarifier 24 without undue manipulation. Testing, review, experimentation, and certification can be more easily accomplished by providing the access opening 18 in this position.

Figure 3:
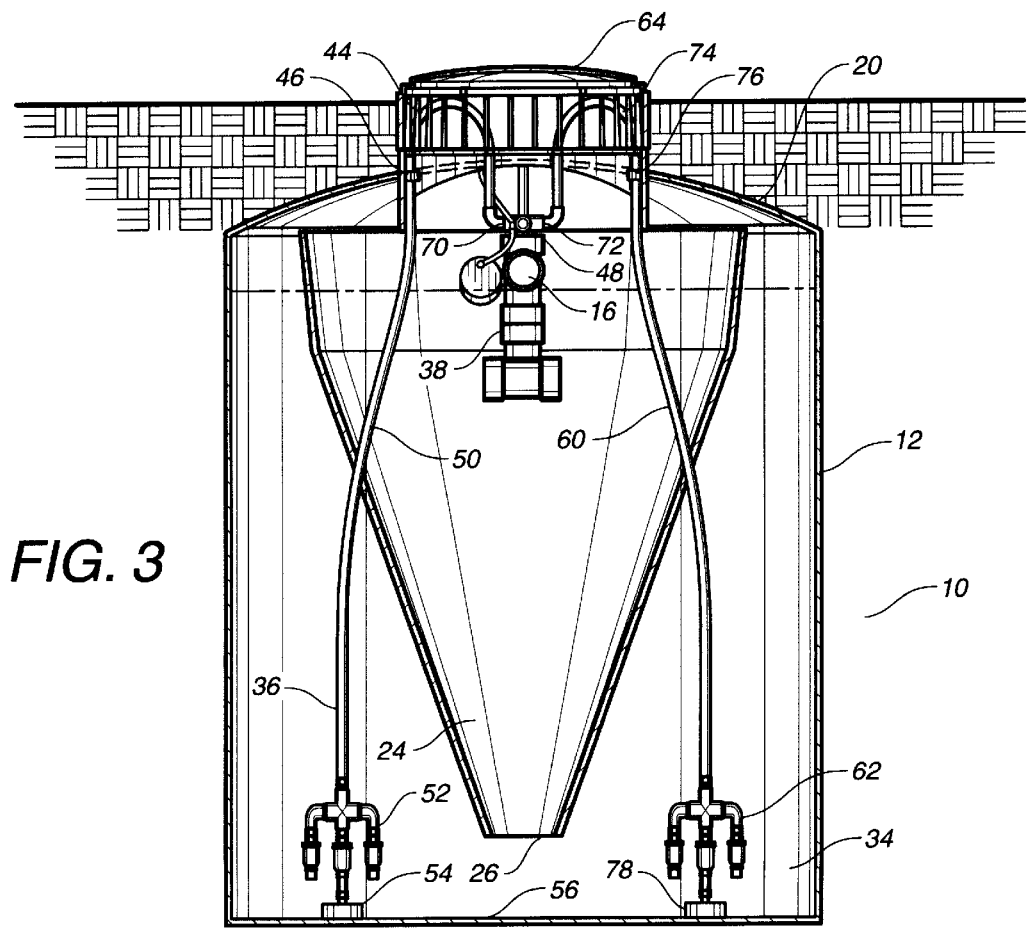
FIG. 3 is a cross-sectional end view showing the wastewater treatment system of the present invention.

FIG. 3 shows another view of the arrangement of the wastewater treatment system 10 of the present invention. In FIG. 3, it can be seen that the tank 12 is of a generally cylindrical configuration. The clarifier compartment 24 is positioned generally centrally of the interior of the tank 12. The aeration compartment 34 is located on the sides of the clarifier 24 and within the inner wall 22 of the tank 12. FIG. 3 shows how the outlet 16 has a T-shaped end piece 38, in the form described herein previously. The access opening 18 is positioned on the top 20 of the tank 12. The cover 64 extends over the access opening 18. The air inlet 48 is shown as having a T-shaped fitting with one end 70 connected to the conduit 50. Another end 72 is connected to the conduit 60. A clip 46 is provided so as to secure the upper end of the conduit 50 in its desired position adjacent to the access opening 18. The conduit 50 extends downwardly through the aeration compartment 34 such that the diffuser assembly 52 will reside with its anchor member 54 resting on the bottom 56 of the tank 12. Similarly, the conduit 60 has a portion 74 at its upper end secured by a clip 76 adjacent to the access opening 18. The conduit 60 will extend downwardly through the aeration compartment 34 and is connected to the diffuser assembly 62. The diffuser assembly 62 is maintained in its fixed position within the aeration compartment 34 through the use of an anchor member 78. Anchor member 78 rests on the bottom 56 of the tank 12. As can be seen in FIG. 3, each of the aerator assemblies 36 and 80 reside directly below the access opening 18. Easy access to each of the conduits 50 and 60 can be accomplished by simply grabbing the upper portions 44 of conduit 50 and 74 of conduit 60 at the access opening 18. The diffuser assemblies 52 and 62 can be pulled up easily through the interior of the tank 12.

Figure 4:
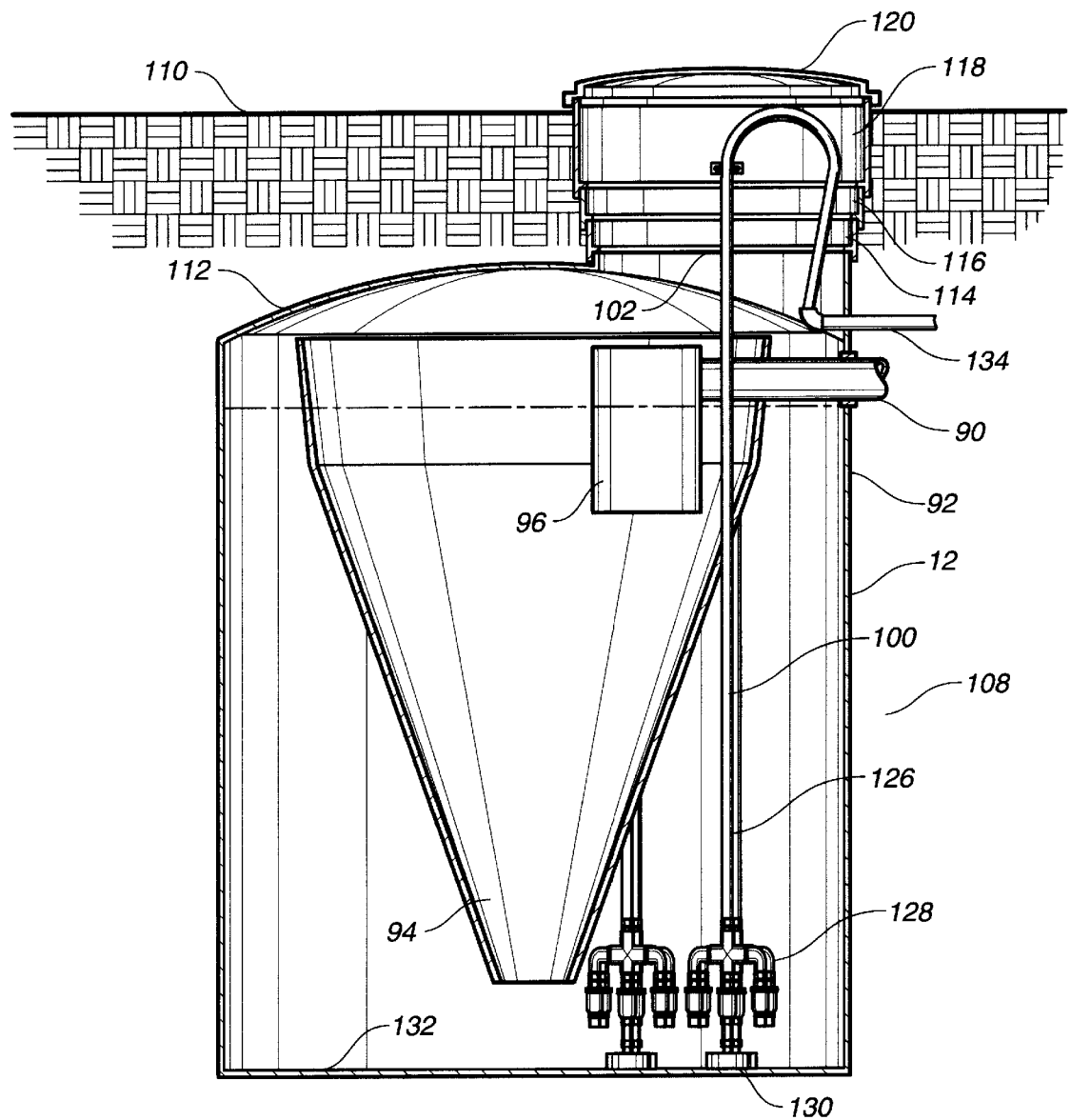
FIG. 4 is a cross-sectional side view showing the alternative embodiment of the wastewater treatment system of the present invention as including a plurality of risers attached to the access opening.

FIG. 4 shows a slightly different alternative embodiment of the present invention. In this alternative embodiment of the present invention, an outlet conduit 90 will extend into the tank 92 and have an end communicating with the interior of the clarifier compartment 94. In FIG. 4, it can be seen that a tertiary filter 96 resides within the clarifier compartment 34. The tertiary filter 96 is designed to remove residual particles and other biological material which may pass toward the outlet 90. Importantly, the filter 96, along with the aerator assemblies, reside adjacent to the area of the access opening 102. When the cover to the access opening 102 is removed, the filter 96 can be easily removed for cleaning or replacement. This alternative embodiment of the present invention facilitates the ability to gain easy access to the filter 96, to the aerator assemblies 100, to the clarifier compartment 94, and to the aeration compartment 104.

An important advantage of the present invention is the ability to bury the tank of the present invention a significant depth below the earth. In FIG. 4, it can be seen how the alternative embodiment 108 of the present invention can be suitably buried a significant distance below the surface 110 of the earth. The embodiment 108 includes tank 92, clarifier 94, filter 96, and the aerator assembly 100. In this form of the present invention, the access opening 102 will reside slightly above the top 112 of tank 92. As can be seen in FIG. 4, a stacked sequence of risers 114, 116 and 118 can be placed upon the access opening 102 so as to allow the tank 92 to be buried a significant distance into the earth. A cover 120 can be placed upon the opening of the uppermost riser 118.

In FIG. 4, it can be seen that the uppermost riser 118 has a clip 122 fastened to a wall thereof. The clip 122 removably receives the upper portion 124 of conduit 126 associated with the aerator assembly 100. A diffuser assembly 128 is attached to the conduit 126. An anchor member 130 is secured to the diffuser assembly 128 so as to maintain the diffuser assembly 128 in a desired fixed position above the bottom 132 of the tank 92. The conduit 126 is connected to an air inlet 134.

In many circumstances, it is necessary to bury a wastewater treatment tank a significant distance below the surface of the earth. With conventional extended aeration systems, this becomes very difficult since the deeper the tank is buried, the more difficult repair and serviceability become. Eventually, when the tank is buried a significant distance, it becomes virtually impossible to access the various aeration assemblies, and other components, within the interior of the buried tank. Risers are commonly used so as to allow the tank to be accessed from above the earth 110. However, because of the rigidity of the various aerator assemblies and the difficulty of threading such assemblies through fixed rigid conduits or through openings in the clarifier, removal of the conduits through the stacked risers can be very difficult.

As can be seen in FIG. 4, this difficulty is overcome with the configuration of the present invention. If a stacked series of risers is required, then the conduit 126 can simply be extended so that the upper portion 124 can be clipped to the inner wall of the uppermost riser 118. In order to remove the diffuser assembly 128, it is only necessary to remove the cover 120, reach into the interior of the riser 118 and grab the uppermost portion 124 of the conduit 126. The diffuser assembly 128 can then be easily lifted from its position at the bottom 132 of the tank 92. It can further be seen that this offset arrangement also allows access to the filter 96 residing within the clarifier 94. Sampling of the wastewater in the aeration compartment and in the clarifier compartment can be carried out by simply lowering sampling instruments through the risers 114, 116, and 118 and through the access opening 102. The present invention, through the use of the offset access opening, facilitates the ability to bury the tank 92 to any desired distance below the earth 110. As such, extended aeration systems can now be made available in virtually all applications without regard to the topographical layout of the installation. It is only necessary to install a suitable height of riser sections onto the access opening 102.

FIG. 5 shows how the clips 46 and 76 can be secured to the inner surface 150 of the access opening 18. The clips 46 and 76 can be metallic or plastic clips which are secured to the inner wall 150 by any type of fastener or adhesive. The clips have a central opening which serves to receive the exterior of the conduits 50 and 60 therein. The clips 46 and 76 are configured so that the conduits 50 and 60 can be easily removed from the end of the clips and replaced into the interior of the clips, as desired. The clips 46 and 76 will not hamper the flow of air through the conduits.

FIG. 6 is a detailed view of the air inlet 48 of the present invention. The end 152 can be connected, by various conduits, to an air pump. Air will pass into the interior of the pipe section 154 toward the branches 156 and 158. The upper end of the conduit 50 is affixed to the branch 156. The upper end of the conduit 60 is affixed by sliding over the end of the branch 158. As such, air can be suitably pumped through the conduits 50 and 60 and downward to the diffuser assemblies, as required.

Figure 8:
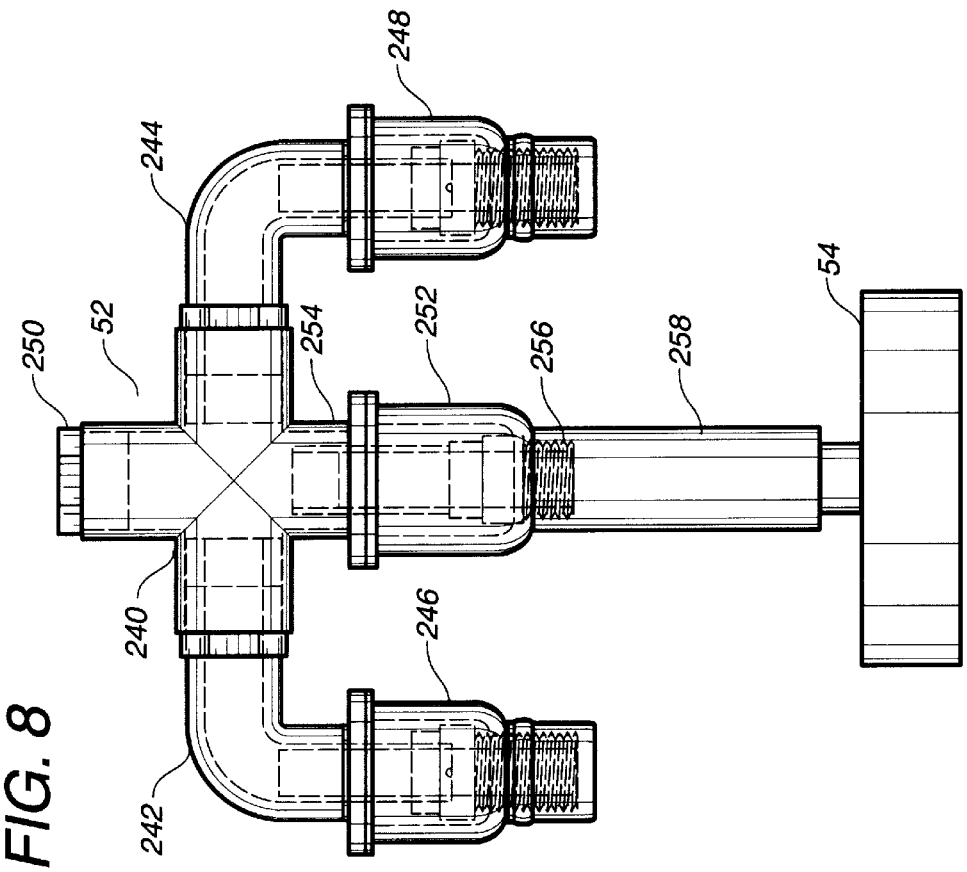
FIG. 8 is a cross-sectional, partially transparent, view of a diffuser assembly in accordance with an alternative embodiment of the present invention.
Figure 7:
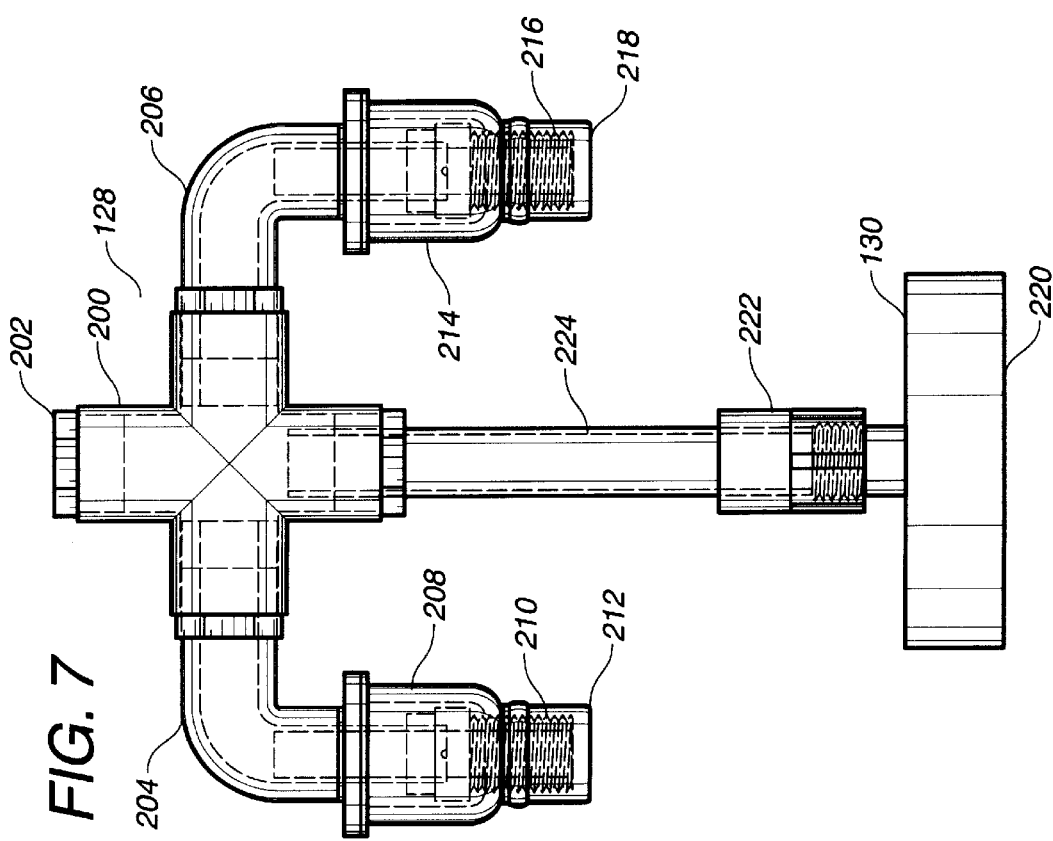
FIG. 7 is a cross-sectional view showing the diffuser assembly of the preferred embodiment of the present invention.

FIG. 7 shows a detailed view of the diffuser assembly 128 (illustrated diagrammatically in FIG. 5). As can be seen in FIG. 8, the diffuser assembly 128 includes a connector member 200 which has a top 202 suitable for connection to the conduit 126. A first rigid conduit 204 extends from the connector member 200. A second rigid conduit 206 extends from an opposite side of the connector member 200. The rigid conduits 204 and 206 form ninety degree elbows extending downwardly. The rigid conduits 204 and 206 can be affixed within the connector member 200 by threading, adhesives, sealants, or by various other means. A first diffuser 208 is affixed to the end of the rigid conduit 204 opposite the connector member 200. The diffuser 208 has a configuration similar to the diffusers shown in U.S. Pat. No. 5,266,239. These diffusers are porous ceramic diffusers having a generally cylindrical configuration. A threaded section 210 extends downwardly below the diffuser 208. A cap 212 is threadedly secured over the threaded section 210 so as to affix the diffuser 208 in its desired position over the end of the rigid conduit 204. Similarly, a second diffuser 214 is secured to the end of the rigid conduit 206 opposite the connector member 200. A threaded section 216 extends downwardly from the diffuser 214. A cap 218 is threadedly secured over the threaded section 216 so as to maintain the diffuser 214 in its desired position over the end of the rigid conduit 206. The rigid conduits 204 and 206 are configured so that the diffusers 208 and 214 are maintained in generally parallel relationship. The caps 212 and 218 serve to seal the diffusers 208 and 214, respectively, so as to prevent any air leakage therefrom. All air is forced through the porous ceramic diffusers 208 and 214 and into the wastewater surrounding such diffusers. Importantly, the threaded connection between the caps 212 and 218 with the threaded sections 210 and 216, respectively, allows the diffusers 208 and 214 to be easily repaired, replaced, or otherwise modified. It is only necessary to unthread each of the caps, slide the diffuser stones 208 and 214 over the ends of the rigid conduits 204 and 206, respectively, so as to remove such diffusers.

The anchor member 130 is also secured to the connector member 200. The anchor member 130 has a suitable weight such that its bottom surface 220 will reside on the bottom of the tank. The anchor member 130 is threadedly connected in a receptacle 222 located at the bottom of rod 224. Rod 224 has its upper end rigidly secured within the connector member 200. The anchor member 130 will reside centrally between and below each of the diffusers 208 and 214.

FIG. 8 shows the diffuser assembly 52 (as illustrated in FIGS. 1 and 3). The diffuser assembly 52 includes a connector member 240. A first rigid conduit 242 is connected to one end of the connector member 240, a second rigid conduit 244 is connected to an opposite end of the connector member 240. Diffusers 246 and 248 are connected to the rigid conduits 242 and 244, respectively, in the manner described hereinbefore in association with FIG. 8. The connector member 240 is connected to the conduit 50 by an attachment section 250.

It should be noted that in each of the embodiments of the diffuser assemblies shown in FIGS. 7 and 8, suitable check valves can be incorporated into such diffuser assemblies either in the area of the connection between the connector members and the conduit or in the area of the rigid conduits just before the associated diffusers. Such check valves can have the same configuration as described in U.S. Pat. No. 5,266,239.

Importantly, in FIG. 8, it can be seen that a third diffuser 252 is secured around a third rigid conduit 254. Rigid conduit 254 is also connected to the connector member 240. A threaded section 256 extends downwardly from the diffuser 252. The anchor member 54 includes a threaded section 258 which can be threadedly secured to the threaded section 256. As such, the construction of the anchor member 54 is suitable for maintaining the diffuser 252 in its desired position at the end of the rigid conduit 254.

It should be noted that the arrangement of multiple diffusers on each of the aerator assemblies achieves advantages not found in the prior art. In many circumstances, a single diffuser would become clogged or inoperative during the operation of an extended aeration facility. Whenever a single diffuser would become inoperative, then an overload condition would be created in the other diffusers or effective wastewater treatment would not occur. As such, it would be imperative to immediately replace the defective or inoperative diffuser. However, through the use of multiple diffusers on a single aerator assembly, if a single diffuser should become inoperative, additional diffusers remain to carry the load. As such, the service life of each of the aerator assemblies becomes longer. The extended aeration wastewater treatment system can carry on for an exceedingly long period of time before replacement of the defective diffuser would be required. Eventually, when replacement or repair would be necessary, the replacement of such a diffuser becomes a very easy task using the construction of the present invention. The diffuser assembly can simply be lifted through the offset access opening, the associated caps unscrewed, and the diffuser removed and replaced. The diffuser assembly can then be lowered back through the access opening such that the anchor member will again reside in its desired position on the bottom of the tank. The present invention eliminates many of the difficulties associated with the prior art.

FIG. 9 illustrates another alternative embodiment 300 of the present invention. As can be seen, the wastewater treatment system 300 includes a tank 302, an aeration compartment 304, a clarifier compartment 306, and aerator assemblies 308 and 310. The aerator assemblies 308 and 310 have a configuration and arrangement similar to that described herein previously. The wastewater treatment system 300 is buried in the earth 312 for a desired distance. Since the wastewater treatment system 300 is suitably buried, the cover 314 to the access opening 316 extends above the surface of the earth 312. In FIG. 9, it can be seen that the platform 318 formed on the top 320 of the tank 302 has a pump/control panel arrangement attached thereto. Initially, it can be seen that the base 322 is affixed to the surface of the platform 318. The base 322 has a pump 324 and a control panel 326 attached thereto. An electrical power supply line 328 extends through the base 322 so as to be connected to the control panel 326. A suitable electric line extends from the control panel 326 so as to provide power to the motor 324. A cover 330 is affixed to the top of the base 322 so as to cover the pump 324 and the control panel 326. A warning light 332 is electrically connected to the control panel 326 so as to provide an indication of a warning condition affecting the wastewater treatment system 300. A reset/test button 334 is also formed on the cover 330 so as to allow the user to reset the control panel 326 or to test the operation of the warning light 332.

In FIG. 9, it can be seen that the control panel 326 has an electrical line 336 extending to the float switch 338. Float switch 338 can provide an indication to the control panel 326 when the level of liquid within the aeration compartment 304 exceeds a desired level. The pump 324 has an air line 340 extending downwardly into the tank 302. Suitable joints are provided along the air line 340 so as to allow the air line 340 to be suitably connected to the aerator assemblies 308 and 310. The airline 340 is suitably connected by a junction 342 to the conduit 344 extending to aerator assembly 308. A T-shaped connector is provided so as to supply air from conduit 340 to the other aerator assembly 318.

In the embodiment 300, each of the aerator assemblies 308 and 310 are located within a pie slice of between 36° and 72° with respect to the transverse cross-section of the tank 302.

In the arrangement shown in FIG. 9, the equipment used for the operating of the wastewater treatment system 300 are conveniently maintained upon the platform 318 in a location adjacent to the tank 302. As such, the arrangement shown in FIG. 9 facilitates the ability to repair, service, and maintain the wastewater treatment system 300. This arrangement also serves to minimize the length of the air line 340 extending from the pump 324 to the aerator assemblies 308 and 310. The air line 340 is maintained in a protected arrangement within the interior of the tank 302. The wastewater treatment system 300 eliminates the need to extend the air line 340 through the earth 312 and minimizes the possibility of a kinking or crushing of the air line 340. As such, the system 300 assures that an air supply is always adequately provided to the aerator assemblies 308 and 310.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A wastewater treatment system comprising:

a cylindrical tank having an inlet and an outlet, said tank having an offset access opening formed at a circular top of said tank, said offset access opening formed between a center of said top and an outer wall of said tank;

an inverted frustoconical clarifier compartment positioned with said tank, said clarifier compartment having an upper edge spaced away from an inner wall of said tank, said upper edge positioned directly below said access opening, said outlet communicating with an interior of said clarifier;

an aeration compartment formed in said tank around said clarifier compartment, said inlet communicating with said aeration compartment; and an aerator extending into said aeration compartment so as to supply air to wastewater within said aeration compartment, said aerator positioned in said aeration compartment adjacent to and directly below said access opening.

2. The system of claim 1, said aeration compartment having a portion formed between said upper edge of said clarifier compartment and said inner wall of said tank, said access opening extending over said portion.

3. The system of claim 1, said aerator comprising:
an air inlet;
a conduit connected to said air inlet; and
a diffuser assembly connected to an end of said conduit opposite said air inlet.

4. The system of claim 3, said conduit having a portion positioned directly below and adjacent to said access opening.

5. The system of claim 4, said tank having a clip member affixed thereto adjacent said access opening, said portion of said conduit being removably received by said clip member.

6. The system of claim 3, said diffuser assembly comprising:
a diffuser connected to said conduit so as to emit air bubbles into said aeration compartment; and
an anchor member connected to said diffuser opposite said conduit, said anchor having a weight suitable for resting against a bottom of said tank.

7. The system of claim 3, further comprising:
another conduit connected to said air inlet; and
another diffuser connected to an end of said another conduit opposite said air inlet, said another diffuser positioned below and adjacent said access opening, each of the diffusers being positioned within a 36° to 72° pie slice of a transverse cross-sectional area of said tank.

8. The system of claim 1, said access opening having an edge aligned with a wall of said tank, said access opening having a diameter less than a radius of said top of said tank.

9. A wastewater treatment system comprising:
a cylindrical tank having an inlet and an outlet, said tank having an offset access opening residing at a top of said tank, said offset access opening formed between a center of said top and an outer wall of said tank;
a clarifier compartment positioned within said tank, said clarifier compartment having an upper edge spaced away from an inner wall of said tank, said upper edge positioned directly below said access opening, said outlet communicating with an interior of said clarifier compartment;
an aeration compartment formed in said tank around said clarifier compartment, said inlet communicating with said aeration compartment;
an aerator extending into said aeration compartment so as to supply air to wastewater within said aeration compartment, said aerator positioned in said aeration compartment adjacent to and below said access opening; and
a plurality of risers affixed in stacked relation over said access opening, each of said risers having an interior opening to said access opening, said plurality of risers extending a desired distance above said top of said tank.

10. An aerator of a wastewater treatment system comprising:
an air inlet;
a conduit connected to said air inlet; and
a plurality of diffusers connected to said conduit at an end opposite said air inlet, said plurality of diffusers comprising:
a connector member in connection with said conduit;
a first rigid conduit extending from said connector member;
a first diffuser affixed to said first rigid conduit;
a second rigid conduit extending from said connector member; and
a second diffuser affixed to said second rigid conduit, said first rigid conduit and said second rigid conduit being in generally parallel relation, said first diffuser being removably affixed to said first rigid conduit, said second diffuser being removably affixed to said second rigid conduit; and
an anchor member connected to said connector member and extending downwardly therefrom.

11. The aerator of claim 10, further comprising:
a third rigid conduit extending from said connector member; and
a third diffuser being removably connected to said third rigid conduit, said third rigid conduit being in parallel relationship to said first and second rigid conduits.

12. The aerator of claim 11, said third rigid conduit having a threaded connection extending below said third diffuser, said anchor member threadedly affixed to said threaded connection and extending below said third diffuser.

13. The aerator of claim 10, said conduit having a clip removably affixed thereto, said clip adapted for positioning a portion of said conduit adjacent an access opening of a wastewater treatment tank, said conduit being flexible.

14. A wastewater treatment system comprising:
a cylindrical tank having an aeration compartment and a clarifier compartment, said clarifier compartment having a generally inverted frustoconical configuration with a central axis; and
two and only two aerator assemblies extending into said aeration compartment, said plurality of aerator assemblies positioned in said tank within a section formed by an angle of more than 36 degrees and less than 72 degrees having a vertex at said central axis.

15. The system of claim 14, each of said aerator assemblies comprising:
an air inlet;
a conduit connected to said air inlet; and
a diffuser connected to said conduit at an end opposite said air inlet.

16. The system of claim 15, each of said aerator assemblies further comprising:
an anchor member connected to said diffuser, said anchor member maintaining said diffuser in a fixed position in said aerator compartment.

17. The system of claim 15, said diffuser comprising:
a plurality of diffusers removably connected to said conduit.

18. The system of claim 15, said air inlet comprising:
an air pump; and
a T-shaped fitting interconnected to said air pump, said fitting having one end connected to a first conduit and another end connected to a second conduit, each of said first conduit and said second conduit being flexible.

19. The system of claim 14, said tank having an access opening formed at a top thereof, said aerator assemblies positioned adjacent to and below said access opening.

20. The system of claim 19, said access opening having a diameter of less than a radius of said top of said tank, each of said aerator compartment and said clarifier compartment having an area located directly below said access opening.

21. The system of claim 19, said tank having an outlet communicating with said clarifier compartment, said outlet having a filter affixed thereto within said clarifier compartment, said filter positioned directly below said access opening.

* * * * *